3,109,780
THROMBOCYN-FIBRINOLYTIC SUBSTANCE
Michael A. Pisano, Hempstead, Alan I. Fleischman, Howard Beach, and Salvatore E. Vaccaro, Jamaica, N.Y., assignors to St. John's University, Jamaica, N.Y., a corporation of New York
No Drawing. Filed Feb. 12, 1962, Ser. No. 172,786
4 Claims. (Cl. 195—101)

The present invention relates to a fibrinolytic substance and particularly to a new and useful fibrinolytic substance, which we have termed "Thrombocyn," and the process for preparing or producing the same.

Thrombocyn is produced by the cultivation of a soil fungus under certain conditions. The organism, identified as *Paecilomyces persicinus* Nicot, has been deposited in the American Type Culture Collection and assigned ATCC 13656. "Quelques micromycètes des sables littoraux," by Nicot, Jacqueline, in Bulletin de la Société Mycologique de France, vol. 74:221–235, 1958.

Thrombocyn is a fibrinolytic substance which lyses preformed human plasma clots and also prevents plasma clot formation under specified conditions. Thrombocyn also lyses fibrin clots prepared from the interaction of purified fibrinogen and thrombin preparations. When Thrombocyn is mixed with fibrinogen and thrombin, fibrin clot formation is prevented.

Thrombocyn can be produced by the submerged aerobic cultivation of *Paecilomyces persicinus* Nicot (ATCC 13656) in an aqueous organic medium of the corn meal-soybean meal type having available sources of carbon and nitrogen at a temperature of about 25–37° C. and at a pH of about 5.0–7.5. A pH of about 6.8 is preferred with the addition of a small amount of calcium carbonate or the like to prevent any excessive drop in pH at the start of fermentation. The following examples will serve to illustrate the invention.

EXAMPLE I

*Production.*—Thrombocyn is produced by the cultivation of *Paecilomyces persicinus* (ATCC 13656) in a culture medium consisting of corn meal, 20 g.; soybean meal, 20 g.; and calcium carbonate, 5 g.; all added to one liter of tap water. The initial pH of the medium was approximately 6.8. Flasks containing the culture medium were inoculated with the organism and allowed to incubate at 28.5° C. on a rotary shaker. After approximately 96 hours incubation, the flasks were removed from the shaker and the culture fluid was filtered through paper. The pH of the filtrate obtained measured 7.5–8.7. At this point, the filtrate contained approximately 1131 fibrinolytic units per mg. nitrogen. The filtrate also contained enzymes capable of attacking the following substrates: casein, gelatin, starch and N-acetyl-glucosamine polymers. In addition the filtrate displayed milk-clotting activity.

EXAMPLE II

Method of Assay

A. *Fibrinolytic.*—Fibrinolytic activity was determined by the length of time required for a suitable dilution of the test substance to lyse a standard fibrin clot at pH 7.2 and at 37° C. when compared with a standard fibrinolytic preparation of known potency. Activity is expressed as fibrinolytic units (F.U.) per volume of fluid or per weight of nitrogen.

B. *Caseinolytic.*—Caseinolytic activity was determined by the method described by Sgouris, Inman, McCall and Anderson and published in Vox Sanguinis, vol. 6, pages 53–59, in 1961. The procedure consists of placing 0.1 ml. of the test sample and 1.9 ml. of pH 7.4 buffer (0.1 molar phosphate-saline) and 4 ml. of 6 percent casein in a test tube and bringing the mixture to 37° C. A 2.0 ml. aliquot is immediately removed (zero time) and another is removed after 60 minutes. Each aliquot is added to an equal volume of 10 percent trichloroacetic acid. Then 3.0 ml. of water are added and the mixture filtered through filter paper. The optical densities of the filtrates are read against a water blank at 2800 A. The difference in the optical densities from zero to 60 minutes is converted to micrograms of acid-soluble tyrosine by reference to a standard curve. One caseinolytic unit has been defined as that amount of fibrinolysin producing an increase of 450 micrograms of acid soluble tyrosin in a 4 percent casein medium in one hour at 37° C. Assay results are quantitated in terms of caseinolytic units (C.U.) per volume of liquid or per weight of nitrogen.

C. *Clot preventing activity.*—Clot preventing unit is defined as the least amount of substance which just prevents the formation of a clot when 0.5 ml. of substance, or a dilution thereof, is mixed with 0.5 ml. of human plasma and 0.5 ml. of isotonic (0.9 percent) saline solution and followed by the addition of 0.5 ml. of 0.05 molar calcium chloride aqueous solution. Assay results are expressed in terms of clot preventing units per volume of liquid or per weight of nitrogen.

EXAMPLE III

*Isolation.*—The following example illustrates a method of isolation but does not limit the isolation procedures. The fermentation filtrate is brought to 4° C. and to it is slowly added 0.8 volume of cold acetone. The inactive precipitate is removed by filtration or centrifugation. To the clear supernatant is added an additional 2.2 volumes of cold acetone, in which case the active material is precipitated. This is removed from the supernatant and dissolved in a small quantity of water. The crude filtrate initially contained approximately 1131 fibrinolytic units per mg. of nitrogen. The isolated material assays at approximately 4245 fibrinolytic units per mg. of nitrogen.

EXAMPLE IV

A. *Purification.*—The activity of the isolated preparation could be further increased by adding to the reconstituted solution 0.75 volume of cold acetone and removing the resulting inactive precipitate. By the admixture of an additional 0.75 volume of cold acetone with the supernatant, the active substance is precipitated. Upon redissolving this active material in a small amount of water, it assayed at approximately 7465 fibrinolytic units per mg. nitrogen.

EXAMPLE V

B. *Purification.*—Another example of the range of procedures applicable to the purification of the active material is to bring a solution of the material with an approximate activity of 4245 fibrinolytic units per mg. nitrogen to 80 percent saturation with solid ammonium sulfate. An active material is precipitated which has approximately the same order of activity as that prepared by purification method (A) above.

Properties

A. *Effect on human blood clots.*—When a clot, formed by the interaction of 0.5 ml. of human blood plasma, 0.5 ml. of 0.9 percent aqueous sodium chloride and 0.5 ml. of approximately 0.05 molar aqueous calcium chloride, is overlayed with 0.5 ml. of a solution of Thrombocyn assaying at approximately 10,750 fibrinolytic units per ml., and the mixture incubated at 37° C., the clot is found to be completely lysed within 30 minutes.

B. *Direct fibrinolytic activity.*—When 0.08 ml. of a sample containing 10,750 fibrinolytic units per ml. is placed on a heated fibrin plate prepared according to the method of Sgouris, Inman and McCall (Biochem. Biophys. Research Commun., vol. 2, page 40, 1960) and incubated at 37° C. for 18 hours, a cleared zone is found on flooding the plate with 10 percent aqueous trichloroacetic acid. This is indicative of direct fibrinolytic activity.

C. *Clot prevention.*—The active preparation has the property of preventing the formation of blood clots in vitro if admixed with human plasma prior to the addition of calcium chloride. The table below illustrates the approximate relationship between the clot preventing activity and the fibrinolytic activity during various stages of purification. The activity is reported as units per mg. of nitrogen.

| Purification Stage | Fibrinolytic Units | Clot Preventing Units |
|---|---|---|
| Crude Filtrate | 1,131 | 4.2 |
| First Acetone Precipitation | 4,245 | 60 |
| Second Acetone Precipitation | 7,465 | 160 |

D. *Direct caseinolytic activity.*—Utilizing the procedure of Sgouris, Inman, McCall and Anderson, as reported in Vox Sanguinis, vol. 6, pages 53–59, 1961; active material assaying at 7465 fibrinolytic units per mg. nitrogen was found to have a caseinolytic activity of 28,700 caseinolytic units per mg. of nitrogen.

E. *Absence of activator activity.*—When the caseinolytic activity determination was repeated with the inclusion of an excess of human profibrinolysin (according to the reference given in D above) no increase in caseinolytic activity was noted. This is indicative of the absence of profibrinolysin activators in the active preparation.

F. *Effect of heating.*—When active crude filtrate was heated under a reflux condenser in a boiling water bath for 30 minutes, the activity was completely destroyed.

G. *Effect of dialysis.*—When active material assaying at approximately 7465 fibrinolytic units per mg. nitrogen was dialyzed in a cellulose membrane at 4° C. against 80 volumes of distilled water for 18 hours, all of the activity was recovered in the non-dialyzable fraction.

H. *Approximate composition of dialyzed material.*—Upon lyophilization, the non-dialyzable fraction was found to have the following approximate composition:

|  | Percent |
|---|---|
| Protein | 49.9 |
| Carbohydrate, polymeric | 53.5 |

Thrombocyn can be used to advantage by diagnostic laboratories to lyse blood clots found in blood obtained from blood banks. Such blood is often used in the preparation of culture media. The presence of clots is undesirable in that they interfere with the preparation of suitable agar substrates containing blood. In addition, the clots alter the composition of the blood fraction.

Specifically, according to the activity of Thrombocyn reported here, the admixture of the latter substance with clot-containing blood prior to the preparation of the culture medium, will produce a blood free of clots, suitable for use in the preparation of blood agar plates. In addition, the admixture of Thrombocyn with stored blood intended for use in blood agar plates will prevent the formation of clots.

We claim:

1. A process for the production of Thrombocyn comprising cultivating a culture medium with available sources of carbon and nitrogen and inoculated with the organism, *Paecilomyces persicinus* (ATCC 13656), and recovering the Thrombocyn therefrom.

2. A process for the production of Thrombocyn comprising cultivating under aerobic conditions an aqueous organic culture medium containing corn meal, soybean meal and calcium carbonate and inoculated with the organism, *Paecilomyces persicinus* (ATCC 13656) at about 25 to 37° C. for about four days, and recovering the Thrombocyn from the resulting fermentation beer.

3. The process of claim 2, where the organism (ATCC 13656) is cultivated at about 28.5° C. and at a pH of about 6.8, the cultured medium is filtered, and the resulting filtrate is fractionated with acetone to recover the active material as a precipitate.

4. The composition resulting from the growth of *Paecilomyces persicinus* (ATCC 13656) in an aqueous organic culture medium having available sources of carbon and nitrogen, said composition being characterized by its ability to lyse human blood clots, fibrin clots, hydrolyze casein, and prevent the formation of blood or fibrin clots, the active material in said composition being heat labile, and non-dialyzable through cellulose membranes, soluble in water but not in acetone or in 80 percent saturated ammonium sulfate.

No references cited.